United States Patent [19]

Arora

[11] Patent Number: 4,474,657

[45] Date of Patent: Oct. 2, 1984

[54] SINGLE STEP ELECTRO CHEMICAL ETCH PROCESS FOR HIGH VOLT ALUMINUM ANODE FOIL

[75] Inventor: Mulk R. Arora, Columbia, S.C.

[73] Assignee: North American Philips Corporation, New York, N.Y.

[21] Appl. No.: 563,345

[22] Filed: Dec. 20, 1983

[51] Int. Cl.$^3$ .............................................. C25F 3/04
[52] U.S. Cl. ............................................... 204/129.75
[58] Field of Search .............. 204/129.75, 129.8, 129.1

[56] References Cited

U.S. PATENT DOCUMENTS 2,209,712  7/1940  Brennan ......................... 204/129.75
3,284,326  11/1966  Martin ............................. 204/129.75
4,332,652  6/1982  Arora ............................. 204/129.75

FOREIGN PATENT DOCUMENTS 52-64659  5/1977  Japan .............................. 204/129.75

Primary Examiner—Thomas Tufariello
Attorney, Agent, or Firm—Jack E. Haken; James J. Cannon, Jr.

[57] ABSTRACT

Aluminum electrolytic capacitor foil of a high cubic texture etched by passing the foil through an electrolyte bath containing 3% hydrochloric acid and 1% aluminum as aluminum chloride under the influence of a direct current and at a temperature of 75° C. The foil thus etched has a significantly higher capacitance resulting from a greater density of tunnels, an elongation of the tunnels, and a fairly linear tunnel structure in the foil.

7 Claims, 5 Drawing Figures

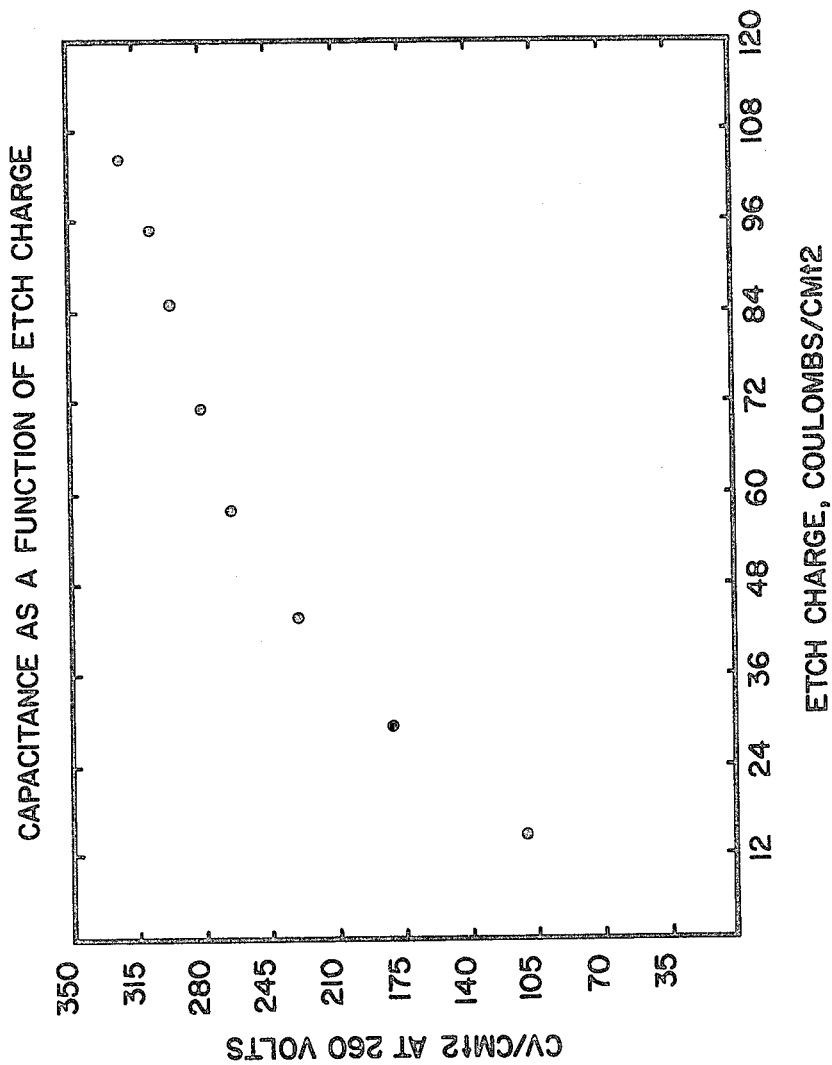

SINGLE STEP ELECTRO CHEMICAL ETCH PROCESS FOR HIGH VOLT ALUMINUM ANODE FOIL

BACKGROUND OF THE INVENTION

1. Field of the Invention

The invention relates to the etching of aluminum electrolytic capacitor foil of a high cubic texture in an etching bath containing hydrochloric acid and aluminum chloride using direct current to produce a foil that has a significantly higher capacitance.

2. Description of the Prior Art

In the typical process of etching aluminum foil for use in electrolytic capacitors, an electrolytic bath containing sodium chloride or other salt and sulfate based electrolytes has been used. However, the capacitance of the resulting foil does not reach the high values which are achieved with the present invention.

U.S. Pat. No. 4,213,835 discloses a method for electrolytically etching a recrystalized aluminum foil which allows manufacture of foils with exclusively pure cylindrical or cubical etching tunnel structures and tunnel densities greater than $10^7/cm^2$ of foil surface. This process uses a potentiostatic etching technique. The problem with this technique is that it does not lend itself to large scale mass production of etched foils.

Still other processes have been used to yield a higher specific capacitance in aluminum foils. The present invention is directed to achieving a significant increase in specific capacitance for high volt foils.

SUMMARY OF THE INVENTION

The invention features the etching of aluminum capacitor foil having a high cubic texture to produce a more uniformly etched foil and etching the foil under the influence of DC current in an electrolyte bath containing 3% hydrochloric acid and 1% aluminum in the form of aluminum chloride at 75° C.

Several factors are necessary for increasing the specific capacitance of aluminum electrolytic capacitor foil. One factor is a significant improvement in tunnel density and tunnel structure. Substantially straight elongated tunnels provide much of the surface area created by etching. As tunnel density is increased, a corresponding enlargement of the surface area will occur. Another major factor in controlling the specific capacitance is the type of aluminum which is used. It is well known that the etched tunnels in anode foil suitable for high volt applications are predominantly in the 100 direction. It is therefore reasonable to assume that foil with greater 100 crystal orientation, that is foil with greater cubic texture, would result in a higher tunnel density. The aluminum foil used for etching until recently has had random cubic texture. Such foils may be called "non-cubic", foils with less than 25% cubic texture. When the extent of cubic texture exceeds 50%, aluminum foils are classified as high cubic. In the present invention an aluminum foil having a high cubic texture, greater than about 50% is preferred because when etched, the tunnel structures are found to be uniform and elongated and the tunnel density can consequently be increased. Another major factor controlling the increase in specific capacitance is the etch electrolyte which controls the tunnel initiation and the depth and width of the etched tunnels. As shown in Table I, a combination of a suitable choice of both aluminum foil to be etched and an etch electrolyte will result in a more uniform tunnel initiation.

TABLE I

| Foil Type | Process Type | CV at 260 Volts, V-uF/$cm^2$ |
| --- | --- | --- |
| Standard Non-Cubic | Conventional | 200 |
| Standard Non-Cubic | Invented | 210 |
| New Hi-Cubic | Conventional | 210 |
| New Hi-Cubic | Invented | 305 |

The chemistry of the etch electrolyte in the present invention is a major factor for controlling the etch characteristics of DC etching of high voltage, e.g. over 200 volt, anode foils. Hydrochloric acid is used in preference to other chlorides in this application because it avoids the precipitation of aluminum hydroxide which can clog the very elongated tunnels which are developed in the process of the present invention. If such precipitation is allowed to occur, it will interfere with the high cubic nature of the foil, thereby not fully utilizing the benefits that can be derived when a suitable combination of the high cubic texture foil and an etch process is employed.

The temperature is maintained at or about 75° C. to minimize evaporation losses thus making the process far more economical and easier to control.

The process of the present invention results in a very simple single step etch process that yields capacitance values equal to or significantly higher than the best available commercial foils without requiring major changes in existing production machinery. The advantages of the inventive process consist in that etched tunnel structures with a tunnel density greater than $10^7/cm^2$ of foil surface are obtained and the etched tunnels are uniformly distributed over the foil. The etching or tunnel diameter required for a planned forming voltage is primarily determined by the electrolytic aluminum erosion rate which can be carefully controlled in the process of the present invention. With the help of the inventive process, the highest possible surface enlargement and capacitance gain with the smallest possible aluminum erosion is obtained while maintaining sufficient foil strength.

BRIEF DESCRIPTION OF THE DRAWINGS

FIG. 5 is a graph showing the effect of etch coulumbs on capacitance in a formed foil.

DESCRIPTION OF THE PREFERRED EMBODIMENT

Aluminum electrolytic capacitor foil of at least 99.99% purity, having a high cubic texture and having a thickness of 100 microns is etched by passing it through an etch electrolyte bath containing 3% hydrochloric acid and 1% aluminum as a chloride under the influence of DC current at 75° C. The current density is 0.155 amps/$cm^2$ and the etch coulombs are 80–90 coulombs/cm$^2$. This process provides an etched tunnel structure as shown by the SEM photographs in FIGS. 2 and 4.

Figure 2:
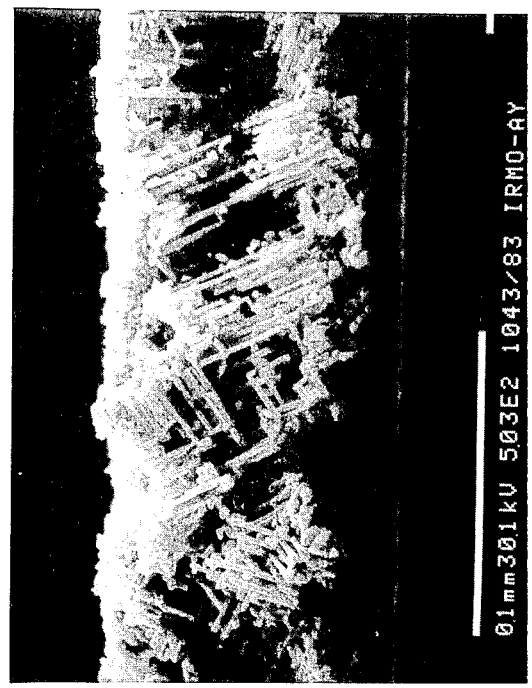
FIGS. 2 and 4 are SEM photographs of a cross-section of a piece of aluminum electrolytic capacitor foil etched according to the process of the present invention showing the relatively straight, elongated tunnel structure which is obtained thereby.
Figure 1:
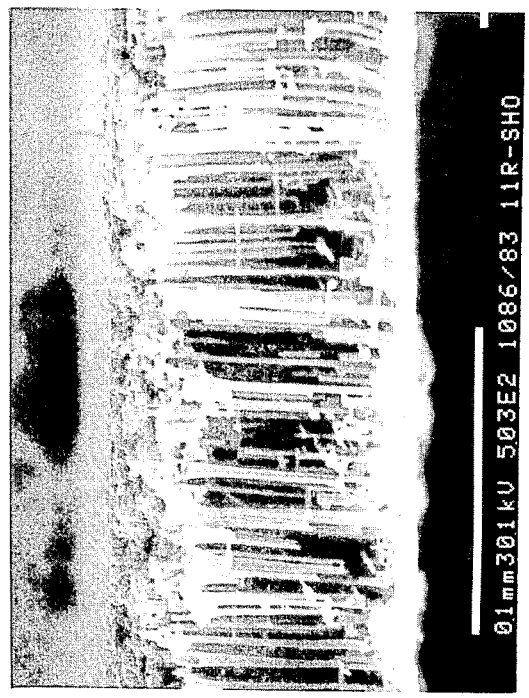
FIGS. 1 and 3 are SEM photographs of cross-sections of a piece of aluminum electrolytic capacitor foil etched in the traditional method showing the tunnel structure thus obtained.
Figure 4:
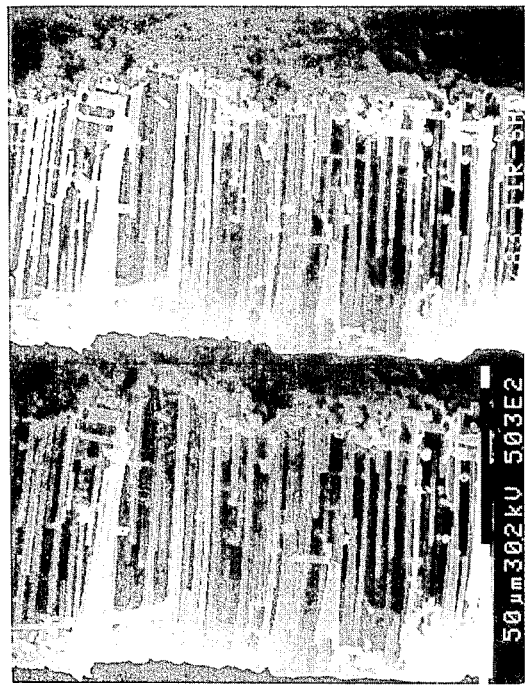
Figure 3:
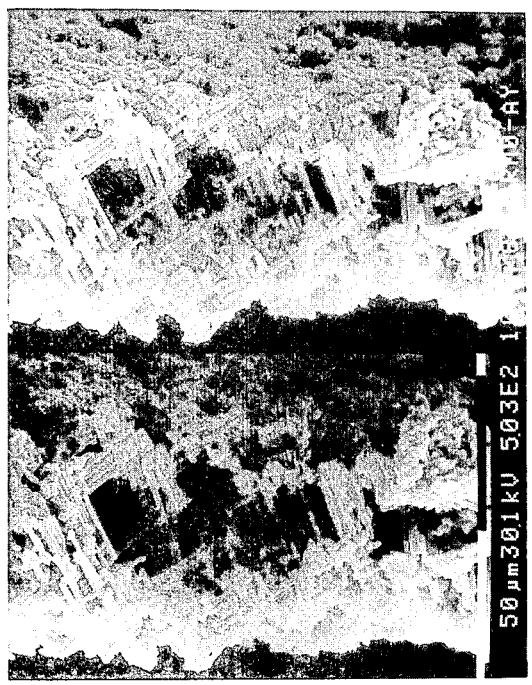

The figures show tunnel structures of a cross-section of etched foil. The linear light grey structures are the etched tunnels of the foil and the boundary surfaces of the foil are slightly discernable above and below the tunnels against the mounting mat. In contrast to the prior art, as illustrated in FIG. 1, the relatively straight, elongated tunnel structure which appears in the vertical plan in the SEM photographs of FIGS. 2 and 4 is evident. The light grey areas which are the tunnels penetrate further through the foil. They appear in a somewhat regular pattern and the density of the tunnel structure is significantly greater than that of the prior art as shown in FIG. 1. Of key interest in the photographs is the fact that many tunnels do not intersect one another thereby removing foil from the structure. When FIGS. 3 and 4 are examined under a stereo viewer, it is clear that the invented process gives a much higher tunnel density as well as a more uniform distribution of tunnels throughout the foil.

In the process of the present invention using 100 micron, high cubic texture foil as described above, the amount of aluminum dissolved in terms of milligrams/cm$^2$ ranges from 8.46 to 9.65. The following table shows the specific capacitance of the foil when anodic oxides are formed at 260 volts and 465 volts. The CV number is the capacitance times the voltage and the CV/mg number is the capacitance times the voltage divided by the amount of aluminum dissolved per cm$^2$. This number is a measure of the relative efficiency of the etching process.

TABLE II

| Al Dissolved mg/cm$^2$ | 260 Volts | | 465 Volts | |
|---|---|---|---|---|
| | CV | CV/mg | CV | CV/mg |
| 8.46 | 306 | 36 | 266 | 31 |
| 9.65 | 304 | 31 | 271 | 28 |

Among the parameters of the present invention, the following variations are permissible. The aluminum foil used is a foil having a very high cubic texture which means that this foil has a high orientation of grains in the 100 direction. For the purposes of the processes of the present invention, it has been discovered that a foil having at least 70% of its grains oriented in the 100 direction is sufficient to achieve the desired results. Such foils are commercially available from Showa Aluminum Company, Toyo Aluminum Company and SCAL, a Division of Pechiney Aluminum Company. A high cubicity foil enables the etching of very straight tunnels while retaining surface area created by the etching. The tunnel initiation tends to be more uniform and the tunnel density can then be increased. The higher the cubicity of the foil, the higher the specific capacitance will be. For production purposes, however, it has been empirically determined that the cubicity of 70% or better will suffice.

A range of values for the other parameters of the present process is also possible. The chemistry of the electrolyte is aimed at producing an acidic medium having a large presence of chloride. Hydrochloric acid is preferred to avoid the precipitation which would occur with sodium chloride. The introduction of aluminum makes the electrolyte bath less expensive and minimizes electrolyte replacement in the process. The range of parameters for the electrolyte bath are as follows.

Hydrochloric acid can be present in concentrations ranging from 1.5% to 7% and the aluminum in the form of chloride can be present in the range of 0% to 2%. The temperature range of the process can be from 70° to 85° C. The current density can range from 0.13 to 0.185 amperes/cm$^2$. The etched coulombs can range from 70 to 110 coulombs/cm$^2$. These ranges have been empirically determined for purposes of mass production of a high volt foil. The latitude in the ranges presented enables high speed mass production of foil without elaborate control systems for monitoring these parameters, thus making the installation of the process of the present invention relatively inexpensive. In terms of the temperature range, over 85° C. evaporation becomes a significant factor. If the temperature is lower than 70° C., the etching process either will not work or will work less efficiently. In terms of the current density, a density below the low point of the range will result in lower tunnel initiation and consequently, lower tunnel density. If the current density is higher than the range stated, the tunnel size will tend to be non-uniform because there will be competition between the deepening of the tunnels already initiated and the initiation of new tunnels. As in any etching process, non-uniform tunnels are to be avoided since many in effect will be closed when the anode foil is formed with an oxide at high voltages.

The following table represents results of some statistical tests showing the amount of foil dissolved by varying the time of the etching process and the capacitance achieved in the etched foil, all using the process of the present invention.

TABLE III

| Al Dissolved | Capacitance at 260 Volts | |
|---|---|---|
| mg/cm$^2$ | MF/cm$^2$ | Volt-MF/cm$^2$ |
| 6.54 | 0.95 | 252 |
| 7.73 | 1.00 | 266 |
| 8.81 | 1.04 | 276 |
| 9.97 | 1.15 | 306 |
| 11.17 | 1.21 | 321 |

In FIG. 5, a graph is presented showing the effect of etch coulombs on capacitance in a formed foil.

From the examples, it is obvious that foils etched in accordance with the present invention can be used in high bolt electrolytic capacitors and yield a significantly higher specific capacitance per cm$^2$ than previously obtained. Thus to obtain the given capacitance, the capacitor can have a smaller volume or for the same volume can have a higher capacitance. Although various minor modifications may be suggested by those versed in the art, it should be understood that I wish to embody within the scope of the patent warranted hereon such modifications as reasonably and properly come within the scope of the appended claims.

I claim:

1. A process for etching aluminum electrolytic capacitor foil wherein such foil has a high cubic texture, greater than 50% cubicity, comprising passing of said foil through an electrolyte bath containing greater than 1.5% hydrochloric acid and aluminum as a chloride under the influence of direct current at a temperature exceeding 70° C.; and passing a charge of more than 70 coulombs/cm$^2$ and having and a current density greater than 0.12 amperes/cm$^2$ to provide an etched foil having a specific capacitance of greater than 300 V-UF/cm$^2$ at 260 volts.

2. A process according to claim 1 wherein said aluminum foil is 100 microns thick and has a cubicity of at least 70% or greater.

3. A process according to claim 1 wherein the percentage of hydrochloric acid in the electrolytic bath can range from 1.5% to 7%.

4. A process according to claim 1 wherein the percentage of aluminum as a chloride in said electrolytic bath can range from 0% to 2%.

5. A process according to claim 1 wherein the temperature can range from 70° C. to 85° C.

6. A process according to claim 1 wherein the current density can range from 0.13 to 0.185 amperes/cm$^2$.

7. A process according to claim 1 wherein the etch coulombs can range from 70 to 110 coulombs/cm$^2$.

* * * * *